（12）United States Patent
Thollot et al.

(10) Patent No.: US 8,863,153 B2
(45) Date of Patent: Oct. 14, 2014

(54) SITUATIONAL RECOMMENDATIONS IN HETEROGENOUS SYSTEM ENVIRONMENT (75) Inventors: Raphael Thollot, Paris (FR); Marie-Aude Aufaure, Chatenay-Malabry (FR); Jean-Yves Cras, Paris (FR)

(73) Assignee: SAP SE, Walldorf (DE)

( * ) Notice: Subject to any disclaimer, the term of this patent is extended or adjusted under 35 U.S.C. 154(b) by 222 days.

(21) Appl. No.: 13/231,210

(22) Filed: Sep. 13, 2011

(65) Prior Publication Data
US 2013/0067496 A1 Mar. 14, 2013

(51) Int. Cl.
G06F 9/44 (2006.01)
G06Q 30/02 (2012.01)

(52) U.S. Cl.
CPC .................................. *G06Q 30/02* (2013.01)
USPC ........................ 719/318; 705/14.53

(58) Field of Classification Search
None
See application file for complete search history.

(56) References Cited

U.S. PATENT DOCUMENTS

| | | | | |
|---|---|---|---|---|
| 2004/0019672 A1* | 1/2004 | Das et al. | | 709/223 |
| 2005/0125276 A1* | 6/2005 | Rusu | | 705/9 |
| 2007/0118394 A1* | 5/2007 | Cahoon | | 705/1 |
| 2008/0040428 A1* | 2/2008 | Wei et al. | | 709/204 |
| 2010/0223212 A1* | 9/2010 | Manolescu et al. | | 706/12 |
| 2011/0276396 A1* | 11/2011 | Rathod | | 705/14.49 |
| 2012/0011198 A1* | 1/2012 | Mazzaferri | | 709/203 |
| 2012/0078595 A1* | 3/2012 | Balandin et al. | | 703/6 |
| 2012/0150642 A1* | 6/2012 | Kandanala et al. | | 705/14.53 |
| 2012/0209886 A1* | 8/2012 | Henderson | | 707/798 |
| 2012/0215785 A1* | 8/2012 | Singh et al. | | 707/741 |
| 2012/0221558 A1* | 8/2012 | Byrne et al. | | 707/723 |
| 2012/0260205 A1* | 10/2012 | Rusu | | 715/771 |

OTHER PUBLICATIONS

European Search Report for European Application 12184321.3-2221, mailed on Nov. 11, 2012; 5 pages.
Official Journal EPO; issue Nov. 2007; pp. 592-593 (http://archive.epo.org/epo/pubs/oj007/11_07/11_5897.pdf).

* cited by examiner

*Primary Examiner* — Emerson Puente
*Assistant Examiner* — Mehran Kamran (57) ABSTRACT

Situational recommendations in heterogeneous system environment are described herein. An event is received, where the event represents an interaction between an agent and a first resource from a number of resources available at the heterogeneous system environment. At least one impacted situation of a number of situations is determined based on the event. At least one operator from a number of operators is determined to apply on the at least one impacted situation. The at least one operator updates the at least one impacted situation. Recommendation of a second resource from the number of resources is generated based on the updated situation.

20 Claims, 9 Drawing Sheets

Events Processed: 700

Related statements: 740

| | Subject | Predicate | Object | Origin | Timestamp | Confidence |
|---|---|---|---|---|---|---|
| Maggie reading document1 730 Origin: EmailClient_Plugin 735 | Q3 | is instance of | Quarter | NER BOE entities | 2011.04.13 -... | 1,00 |
| | France | is instance of | Country of origin | NER BOE entities | 2011.04.13 -... | 1,00 |
| | document 1 742 | mention | Year | NER BOE entities | 2011.04.13 -... | 1,00 |
| | document 1 743 | mention | Q3 | NER BOE entities | 2011.04.13 -... | 1,00 |
| | document 1 744 | mention | Sales Person | NER BOE entities | 2011.04.13 -... | 1,00 |
| | document 1 | mention | Quarter | NER BOE entities | 2011.04.13 -... | 1,00 |
| | document 1 | mention | France | NER BOE entities | 2011.04.13 -... | 1,00 |
| | document 1 | mention | Year | NER BOE entities | 2011.04.13 -... | 1,00 |
| Queued Events 720 | Text-to-query | recommend | (Sales revenue) by Quarter... | Text-to-query | 2011.04.13 -... | 1,00 |
| 760 | Text-to-query | recommend | (Revenue) by Year, Quarte... | Text-to-query | 2011.04.13 -... | 1,00 |
| 770 | Text-to-query | recommend | (Revenue) by Quarter, Sal... | Text-to-query | 2011.04.13 -... | 1,00 |
| 780 | (Revenue) by Ye... | has measure | Revenue | Text-to-query | 2011.04.13 -... | 1,00 |
| | (Revenue) by Ye... | has dimension | Quarter | Text-to-query | 2011.04.13 -... | 1,00 |

742 744 746 748 750 752

Statement details

| Subject | | Predicate | | Object | |
|---|---|---|---|---|---|
| Label | Text-to-query | Label | recommend | Label | (Revenue) by Year, Qua |
| Type | /1.0#SituationOperator | Type | Infomesh/1.0#Predicate | Type | providers/boe#BOQuery |
| URI | /instances/TextToQuery | URI | /instances/TextToQuery | URI | b0-bca5-ebe3a2d75457 |

| Origin | |
|---|---|
| Label | Text-to-query |
| Type | /1.0#SituationOp |
| URI | /instances/TextT |

SITUATIONAL RECOMMENDATIONS IN HETEROGENOUS SYSTEM ENVIRONMENT

FIELD

Embodiments of the invention generally relate to the software arts. More specifically, to data recommendations based on contextual information.

BACKGROUND

Information overload is a well-known issue in information systems. Users are faced with the problem of choosing among many possible resources to determine those likely to satisfy their needs. In many cases, users may be assisted in overcoming the information overload problem by being exposed to relevant data items, information, services, etc. In web environments, such as commercial websites, items of interest are determined and recommended to enable more efficient selection of information. Usually, web sites recommend items such as music, articles, web pages, keyword queries, books, online videos, friends, etc. Recommender systems aim at providing recommendations of relevant data to users to improve and accelerate navigation in a vast space of information resources. A recommender system (RS) would explore items to determine those of interest for a particular user based on the user's preferences and interests. Typically, items similar to those a user preferred in the past are recommended as relevant (e.g., content-based approach) and/or items that users with similar tastes and preferences liked in the past (e.g., collaborative approach).

RS could be employed to recommend relevant resources to business users to improve their productivity and help them explore relevant available resources. Conventionally, business users interact with different communicating business applications and systems, e.g., Customer Relationship Management (CRM), Enterprise Resource Planning (ERP), Product Lifecycle Management (PLM), etc. Consequently, the recommendation of relevant resources to a business user imposes additional constraints, as opposed to scenarios where a user is limited to a web site within a browser. An example of such constraints is accessing different resources such as documents, processes, applications, structured data, etc., retrieved from various source systems, e.g., CRM, ERP, Human Resources (HR), and Business Intelligence (BI) systems, etc. Usually, such systems impose additional security controls, e.g., restricted access rights to data pertinent to a finance or human resources departments. On contrary, various web resources, e.g., commercial products, video clips, songs, may be freely available and recommended to every user in a web site. Additionally, when a user is interacting with diverse applications, a uniform user profile is rarely shared between the applications. As a result, fragmented or inconsistent data about the user activities and preferences are generated. In many cases, there is a need to recommend heterogeneous resources provided by various computer systems or applications that impose different security controls to a business user.

SUMMARY

Various embodiments of systems and methods for situational recommendations in heterogeneous system environment are described herein. According to one aspect, an event is received or generated at a recommender system. The event represents an interaction between an agent and a resource from a number of resources available in the heterogeneous system environment. Based on the event, at least one impacted situation of a number of situations and at least one operator from a number of operators are determined. In another aspect, the operator is applied to update the at least one impacted situation based on the event. In yet another aspect, a recommendation to another resource from the number of resources is generated by the recommender system based on the updated situation.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 7 shows a graphical user interface (GUI) screen including situation statements generated by a Text-to-Query recommender operator in response to an event, according to one embodiment.

DETAILED DESCRIPTION

Embodiments of techniques for situational recommendations in heterogeneous system environment are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Typically, a business user operates in a heterogeneous system environment such as a corporate network. In one embodiment, a heterogeneous system environment includes integrated systems built on different platforms that may also employ different programming languages. Further, these systems may be distributed across various networks. Such systems may also provide different and heterogeneous resources. For example, resources may be stored in various formats, including, text files, eXtensible Markup Language (XML) files, spreadsheets and a variety of proprietary storage methods, each imposing different data access methods.

A resource may be an entity, physical or abstract, that may be recommended. In an embodiment, a resource refers to an identified object that may be accessed, located or is otherwise available. Further, a resource may be assigned or identified by a Uniform Resource Identifier (URI). For example, resources include, but are not limited to, electronic documents, images, electronic services, computer applications or tools, devices, files, network connections, memory areas, web pages, queries, collections of other resources, etc. From a different perspective, resources may include users, customers, corporations, etc. In an embodiment, examples of abstract resources include, but are not limited to, types of relations (e.g., "parent" or "employee"), classes, properties or other kind of ontologies or concepts, actions (e.g., "open document", "create report"), etc.

In a heterogeneous system environment, it may be advantageous to enable recommendations of heterogeneous resources available in the environment. For example, depending on the context, a user may receive automatically generated recommendations including references to a customer from a CRM system, an application or tool on a company's Intranet, BI queries, a workflow to follow, other employees or contacts, etc.

In one embodiment, a common representation data model of heterogeneous resources and relations between these resources is implemented. Based on such model, suggestions of heterogeneous resources are enabled. Example of such data model is a graph representation. Often, systems that are part of a heterogeneous system environment implement different security and role-based access to respective data resources. The recommendation process should conform to data security controls enforced by the involved systems.

Usually, the context of a user changes during user's interactions with systems and applications. Context may refer to any information that may be used to characterize the situation of an entity, e.g., location, identity, activity, time information, etc. An entity may be anything considered relevant to the interaction between a user and an application, including, but not limited to, time, place, person, the user and the application themselves, etc. A situation may be a collection of states of entities relevant to an interaction between the user and the computer system environment.

Typically, changes of a user's context results in changes in the user's needs. Further, the degree of relevancy of a data resource to a user may also depend on the current user's context or situation. Therefore, information relevancy also changes based on the new context. In one embodiment, more effective and tailored suggestions are enabled by utilizing contextual information into the recommendation process. In one embodiment, a RS may dynamically adapt to current user's actions and enable timely and personalized recommendations. The reverse case is possible; a user's needs affect the user's context.

Figure 1:
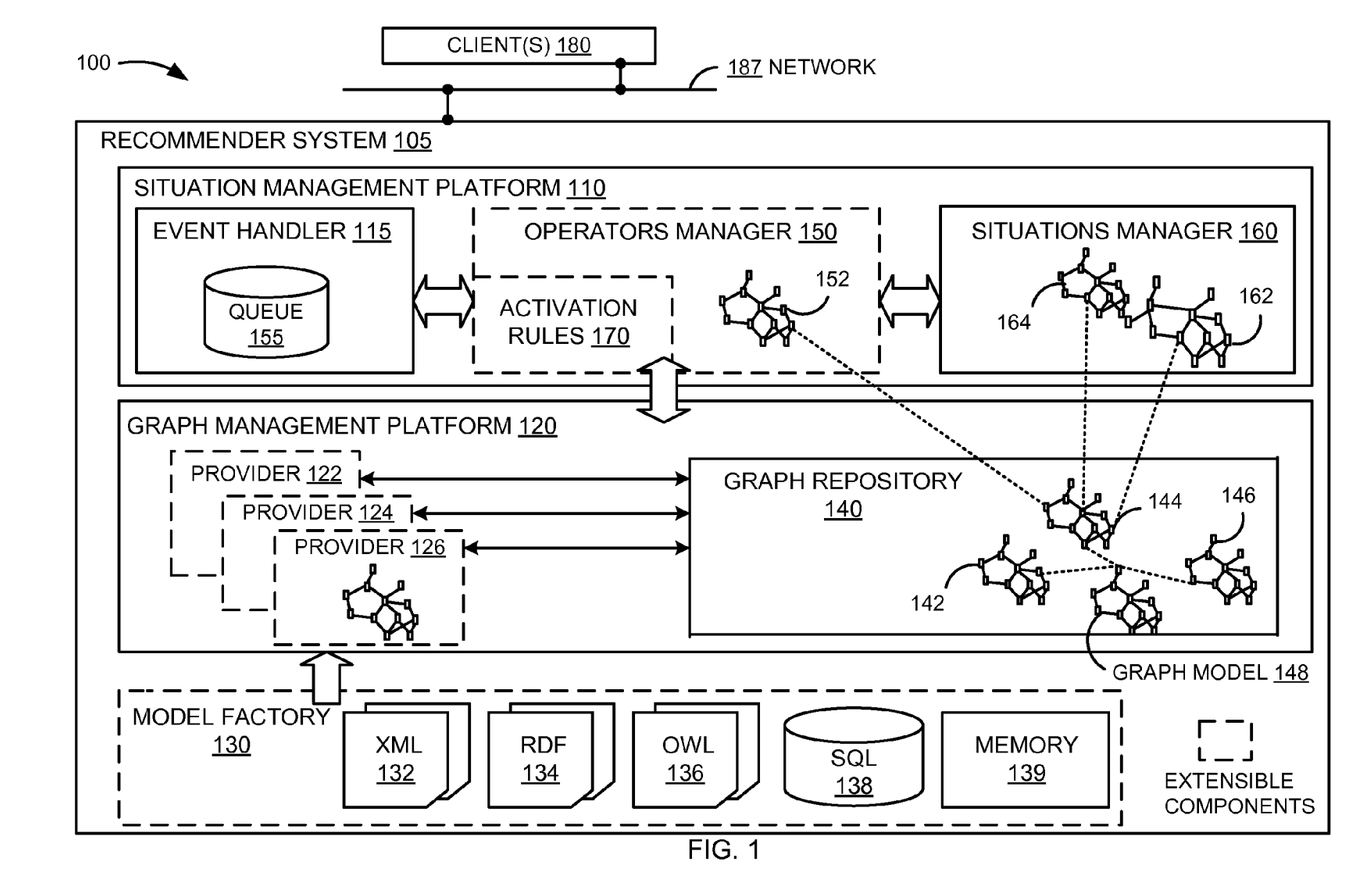
FIG. 1 illustrates exemplary system architecture of situational recommender system to recommend heterogeneous resources, according to one embodiment.

FIG. 1 illustrates exemplary system architecture 100 of situational recommender system 105 to recommend heterogeneous resources, according to one embodiment. A situational system may be defined as a system that, based on a user's situation, provides relevant resources to the user. In one embodiment, a situation may be implemented as a collection of situation statements. A situation statement describes a relation between at least two resources. Situation statements may be expressed as one or more tuples representing assertions. Each assertion may be formed by a subject "S", a predicate "P" and an object "O"—(S,P,O). For example, in the statement "Maggie reading document 1", Maggie is the subject "S", document1 is the object "O" and "reading" is the predicate "P". The predicate "P" qualifies the relation between "S" and "O" and defines its semantics.

In one embodiment, situation tuples (S,P,O), may be extended to include additional metadata "M", e.g., specifying temporal restrictions, privacy settings, level of confidence, accuracy, etc. In such a case, a situation statement may be expressed by one or more tuples (S,P,O,M), where $$M=(origin, t, l, s, c).$$

In this equation, "t" is a timestamp indicating when the situation statement was generated; "l" is expected lifetime or validity period of the situation statement; "s" is an ownership and privacy setting indicating who owns the situation statement and whether it is public, private or has custom access authorizations; "origin" indicates which system or user has created the situation statement; and "c" shows the level of confidence or other type of ranking indicating the level of accuracy, quality, completeness, or reliability of the situation. In one embodiment, other types of metadata may be integrated to situation tuples, including another related tuple.

Recommender system 105 is connected to client(s) 180 via network 187 and includes situation management platform 110, graph management platform 120, and model factory 130. Model factory 130 includes data sources for the recommender system 105. A data source is an information resource. Data sources include sources of data that enable data storage and retrieval. Data sources may include databases, such as, relational, transactional, hierarchical, multi-dimensional (e.g., OLAP), object oriented databases, and the like. Further, data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include data source where the data is not tangibly stored or is otherwise ephemeral such as data streams, broadcasted data, and the like. The data sources can include associated data foundations, semantic layers, management systems, security systems, etc.

Model factory 130 may encompass data sources, including but not limited to, XML files 132, Resource Description Framework (RDF) files 134, Ontology Web Language (OWL) files 136, SQL database 138, or memory 139. Data sources of model factory 130 such as XML 132, RDF 134, OWL 136, SQL 138, and memory 139, store raw data of available resources. The model factory 130 enables storage and retrieval of a number of available heterogeneous resources. In one embodiment, data sources of model factory 130 may be distributed across one or more source systems that are either internal or external to recommender system 105, or both. These systems may communicate over public or corporate networks, e.g., network 187. Examples of external source systems include, but are not limited to, a Lightweight Directory Access Protocol (LDAP), a CRM system, BI platform, social network, etc.

In one embodiment, the data sources 132-139 included in model factory 130 are communicatively coupled to graph management platform 120. The graph management platform 120 describes the heterogeneous resources available at data sources 132-139 available in model factory 130. Further, the graph management platform describes existing relations between the resources 132-139, e.g., in a graph-based data model, to enable uniform data representation.

Graph management platform 120 includes providers 122-126 and graph repository 140. Providers 122-126 are added to graph management platform 120 to connect to one or more corresponding data sources 132-139 available in model factory 130. In one embodiment, each provider 122-126 is customized to communicate with respective data source included in model factory 130. Examples of providers include, but are not limited to, social provider to connect to LDAP; BI provider to define OLAP cubes, dimensions, measures, dependencies, hierarchies of the underlying data; Text Analysis Provider to enable Named Entity Recognition (NER) and facts extraction; etc.

Providers 122-126 may specify how to access and retrieve data from the corresponding data sources accessible through model factory 130. For example, a data source may be a BI data warehouse such as SQL database 138 and a provider from providers 122-126 may specify logic to query or modify data in the BI data warehouse using SQL requests. Similarly, a provider from providers 122-126 may be modeled to query RDF files 134, using SPARQL Protocol and RDF Query Language (SPARQL). SPARQL is used to extract information from RDF files, RDF Site Summary (RSS), and the like.

In one embodiment, providers 122-126 connect graph repository 140 to data sources such as data sources 132-139. As illustrated, exemplary graph repository 140 includes graph model 148 and graphs 142-146. In one embodiment, graph model 148 is a general model of resources available through model factory 130. The graph model 148 may include nodes corresponding to or describing resources, and edges to represent relationships between the resources. In one embodiment, graph model 148 may be implemented as a base schema using Resource Description Framework Schema (RDFS) language. Building and maintaining a complete graph of available resources may be inefficient or infeasible, e.g., due to performance reasons, computational costs, technical limitations, etc. Additional graphs, such as graphs 142-146, may be added to graph repository 140 on a per-need basis by extending graph model 148.

In one embodiment, graph model 148 serves as a base model that may be further extended by providers 122-126. Each provider 122-126 may register at graph repository 140 to retrieve and extend graph model 148 with specific nodes and relations defining corresponding graphs 142-146, respectively. Each provider 122-126 may connect to a corresponding data source from model factory 130 to retrieve available resources provided by the respective data sources 132-139. Providers 122-126 may populate the retrieved resources to their corresponding graphs 142-146.

In one embodiment, each graph 142-146 is built based on graph model 148 by at least one corresponding provider from providers 122-126. Graphs 142-146 may be implemented as extended schemas of the schema of graph model 148. Graphs 142-146 may further include specific nodes and edges defined in accordance with respective data sources 132-139. In one embodiment, each graph 142-146 is specific to a particular data source available in model factory 130 and is built upon graph model 148 to model and represent resources provided by the corresponding data source.

The nodes and edges of graphs 142-146 may represent resources and relations between these resources, accordingly. In one embodiment, one or more nodes and edges of graphs 142-146 correspond to resources provided in model factory 130 that are identified by URIs. The complete graph of graph repository 140 is defined by merging the schema of graph model 148 with extended schemas of graphs 142-146 that are build by their respective providers 122-126. Therefore, graph repository 140 may be described as an aggregation of several partial graphs 142-146.

In one embodiment, graph management platform 120 maintains graph models to enable uniform representation of heterogeneous data resources and relations between the data resources available in model factory 130. Furthermore, model factory 130 may be extended by adding new data sources. Based on these new data sources, new providers may be built and added to graph management platform 120 to retrieve data resources available through the new data sources.

Situation management platform 110 manages users' situations occurring during the interactions between client(s) 180 and recommender system 105. Client(s) 180 may be one or more entities, including users and client applications, operable to generate events dispatched to recommender system 105 via network 187. An event may refer to an interaction between at least two data resources and may be described as a specific type of situation statement, where the interaction is represented by the relation between the resources. For example, interactions between users and other available resources, such as "Maggie reading document1", "John has meeting with Maggie", etc., define corresponding events. In one embodiment, events may be time-dependent situation statements that are valid for a given period of time, as opposite to other situation statements that describe static relations between resources. An event may be either external to recommender system 105, e.g. dispatched to recommender system 105 by client(s) 180, or internally raised within recommender system 105.

Situation management platform 110 includes event handler 115, operators manager 150 and situations manager 160. Situation management platform 110 receives events for processing. In one embodiment, the processing of an event may result in long running operations. Therefore, event handler 115 adds the received events to queue 155 to be prioritized and processed asynchronously.

Figure 2:
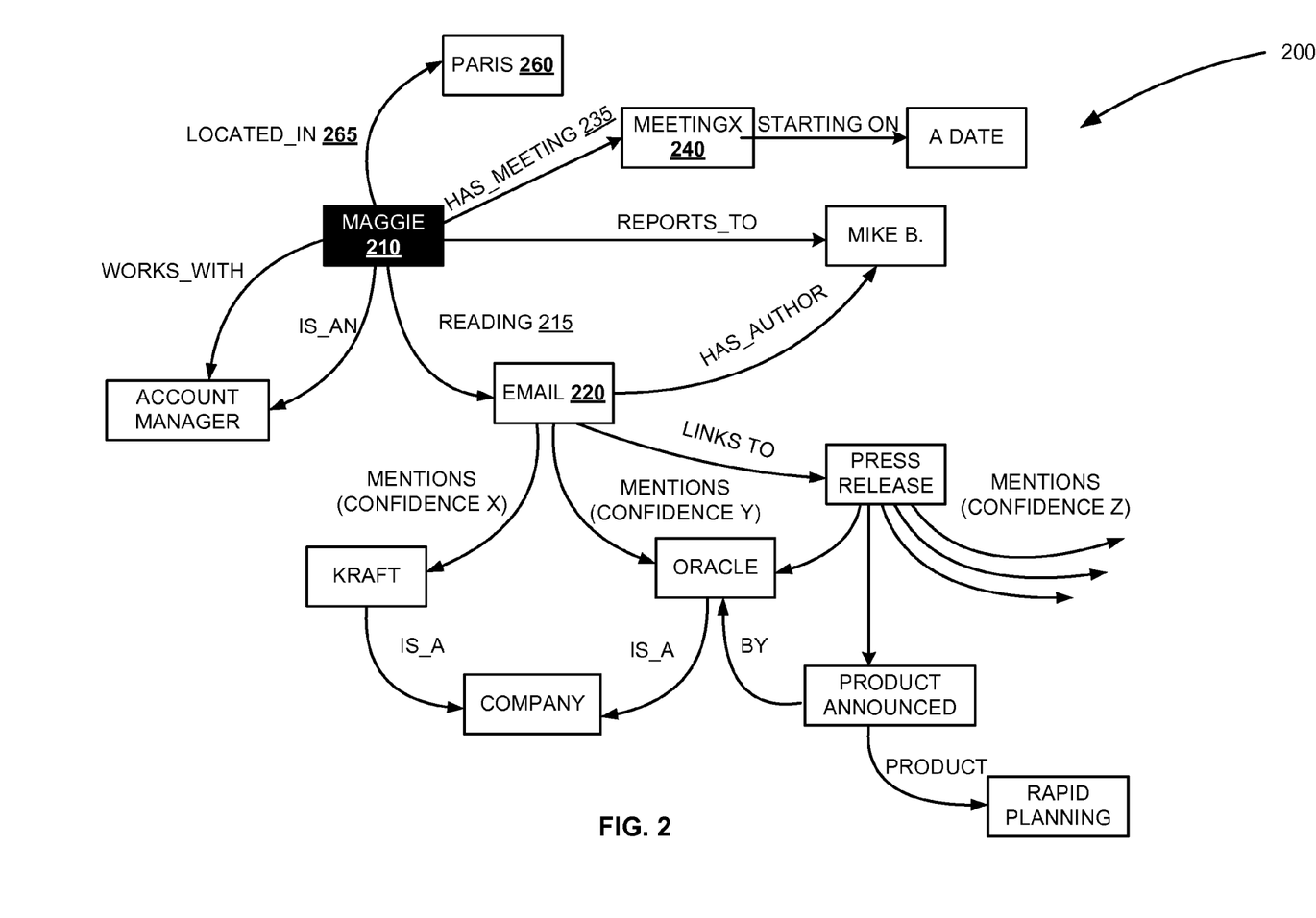
FIG. 2 illustrates an exemplary situation graph, according to one embodiment.

Situations manager 160 monitors situations of entities that are relevant to events received or generated at recommender system 105. In one embodiment, a situation is collection of related situation statements or tuples. Situation graphs 162-164 represent monitored situations in the form of a graph. A situation graph can be defined as a collection of valid situation statements that are represented in the form of a graph. In one embodiment, a situation graph represents a user's situation at a certain point in time. An example of situation graph of a user is illustrated in FIG. 2. In one embodiment, the collection of situation statements or tuples, that constitute a situation, are arranged in situation graphs. For example, the subject "S" and the object "O" of a tuple may be represented as nodes and the predicate "P" may be represented as an edge between the nodes of "P" and "O".

In one embodiment, as an event is dispatched to or otherwise detected by recommender system 105, situation manager 160 starts to monitor situations impacted by the event. Initially, impacted situations may be situations of the subject "S" and/or the object "O". For example, in one embodiment, once a user authenticates to recommender system 105, situations manager 160 retrieves a list of relevant to the user situation statements, where these situation statements constitute the user's current situation graph. Thus, the user's situation is loaded to situations manager 160. When recommender system 105 starts to monitor the situation of a user or an agent, e.g. when an event concerning this user or agent occurs, the agent's situation graph is initialized based on previously stored situations that are still valid. An agent is a resource present in the recommender system 105 that may generate a situation statement. In one embodiment, the "origin" of a situation statement indicates the agent that has created the statement. Examples of agents include, but are not limited to, providers, users, client applications, operators designed to perform various operations on situations, e.g., updating situations in response to events, etc. In one embodiment, situation manager 160 keeps graphs of monitored situations, such as situation graphs 162-164, in a cache. In yet another embodiment, situation manager 160 initialize situation graphs 162-164, on a per-need basis, from situation statements retained in graph repository 140. Situation graphs may be retrieved at situation manager 160 by querying graph repository 140.

Activation rules 170 are designed to react to specific events and, if certain conditions are met, to trigger additional processing in response to the events. One or more particular rules from activation rules 170 may be tailored to react to one or more specific events or event types. For example, one rule may be specified to react to events of type "a user is interacting with unstructured document".

Operators 152 available in operators manager 150 are used to manipulate situations by adding, deleting or updating situation statements or tuples. Operators from operators manager 150 may define any operation that may be applied on graphs from graph repository 140 or situations graphs monitored in situation manager 160. An operator is a module that takes as input an event and a situation, and returns the situation updated to reflect the event and/or information that is generated as a result of the operator's processing. Operators may be used to maintain and perform operations on situation graphs. For example, operators may add, delete or update nodes and/or edges of situations graphs. In one embodiment, operators may assign values to blank nodes of graph models available in graph repository 140, based on received events.

Recommendation operator is a special kind of operator. A recommendation operator may add a recommendation situation statement to a situation graph managed by situations manager 160. For example, a recommendation statement may be "Recommender1 recommend productX". In one embodiment, based on added recommendation statement, relevant resources are recommended to users. Other types of operators may include, but are not limited to: stemming operator that may reduce words of unstructured documents to their roots so that different grammatical forms are identified of the same words; expiry checker to determine outdated situation statements and to remove them from situation graphs; consistency checker to resolve conflicting situation statements to ensure coherent context, NER operator, etc.

Once, an event from queue 155 conforms to at least one activation rule from activation rules 170, it is further determined what operator available in operators manager 150 applies in response to the interpretation of the event. More than one activation rules from activation rules 170 may be used to trigger the same operator under different conditions. Thus, reusability of operators already developed is possible.

FIG. 2 illustrates an exemplary situation graph 200, according to one embodiment. Situation graph 200 represents the situation of user agent Maggie 210. In an embodiment, the situation of a given agent at a certain point in time is a collection of valid situation statements. Further, the situation may be represented as a situation graph including the respective agent. Situation graphs represent resources and relations between the resources in a graph model. Situation graph 200 represents relations between user agent Maggie 210 and other resources. Example of such relation is "Maggie located in Paris", where node 210 represents the subject "Maggie", node 260 represent the object "Paris", and edge 265 represents the relation "located in". Another example is "Maggie has meeting meetingX", represented by nodes 210, 240, and edge 235, respectively. Also, "Maggie reading email", represented by nodes 210, 220, and edge 215, respectively.

Figure 3:
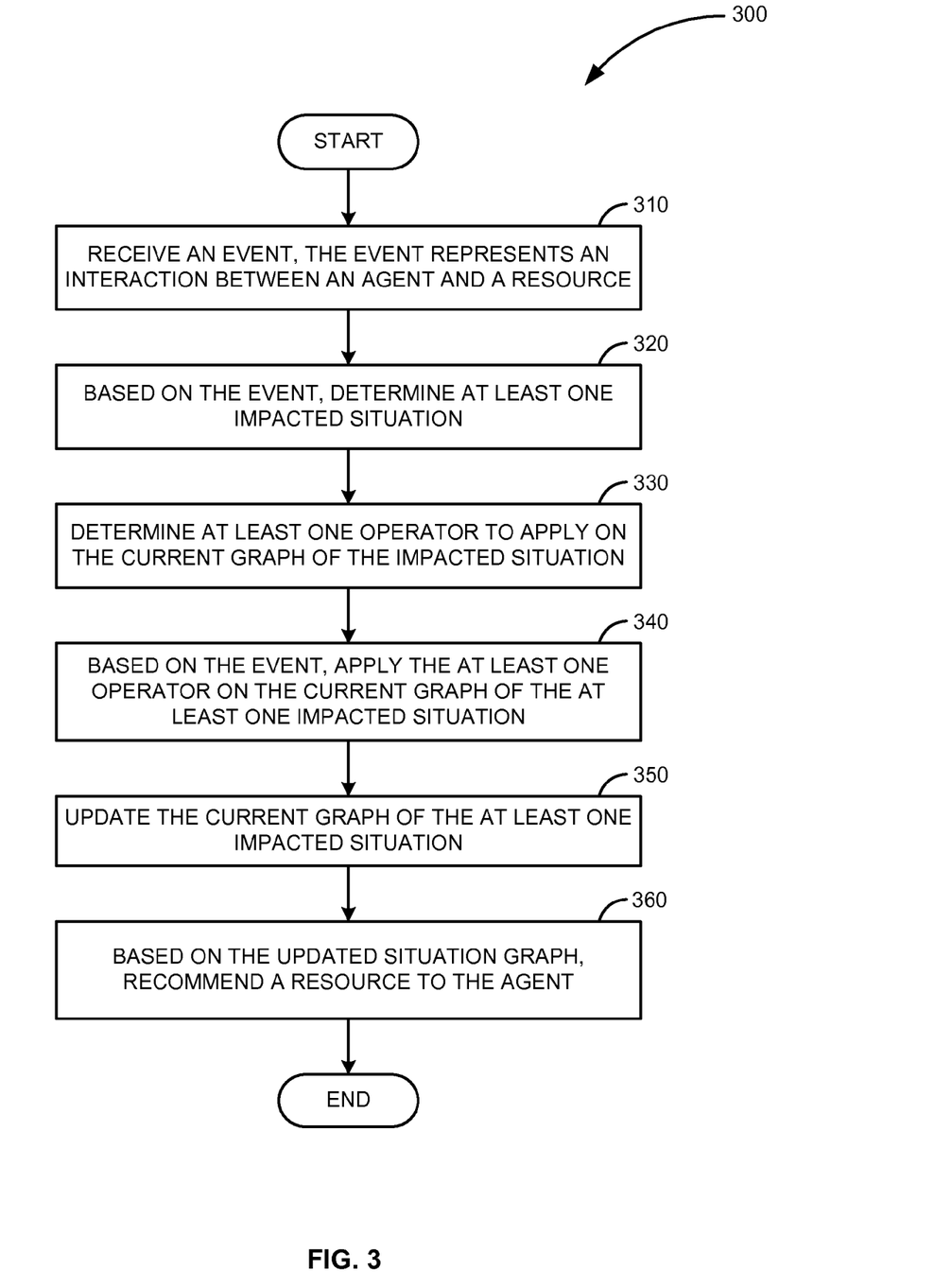
FIG. 3 illustrates process for recommending a data resource to an agent in response to an event, according to one embodiment.

One or more recommendations may be provided to an agent in response to an event, where the recommendations are based on the agent's situation. FIG. 3 illustrates process 300 for recommending a resource to an agent in response to an event, according to one embodiment. The process starts at 310 with receiving an event. The event represents an interaction between an agent and a resource. In one embodiment, an event may be externally triggered, e.g. sent to recommender system 105 by client(s) 180 in FIG. 1. An example of externally triggered event is "Maggie reading document1". In this example, "Maggie" is an agent that is an external user and "document1" is a resource. In yet another embodiment, an event may be internally triggered, e.g., by internal agents of recommender system 105. An example of internally triggered event is "OperatorX has processed document1". Accordingly, "OperatorX" is an internal agent program and "document1" is a resource.

In one embodiment, events may be described in RDF format. Further, events may conform to a certain model or schema such as graph model 148 in FIG. 1. Example of the event "Maggie reading document1" implemented in RDF format is the following:

```
<rdf:RDF xmlns:gr=".../grepo/1.0#" ...>
  <rdf:Description rdf:nodeID="A0">
    <rdf:type rdf:resource=".../#Statement"/>
    <gr:subject rdf:resource=".../users/Maggie"/>
    <gr:predicate rdf:resource=".../predicates/reading"/>
    <gr:object rdf:resource=".../document1"/>
    <gr:origin rdf:resource=".../EmailClient_Plugin"/>
    <gr:priority>2</gr:priority>
  </rdf:Description>
</rdf:RDF>
```

Referring back to FIG. 1, in one embodiment, client(s) 180 send events to recommender system 105 in response to user's interactions. An example of a method for sending an event is the "/event POST" method, based on REpresentational State Transfer (REST) services. The "/event POST" method may describe the event in RDF format. The output of the method may be an URI sent to recommender system 105, where the URI identifies the event's corresponding situation statement or tuple. Once an event is received, it may be stored in a queue such as queue 155 in FIG. 1 to be handled asynchronously, in accordance to their priority.

At 320, at least one impacted situation is determined based on the event. Generally, situations of the subject "S" and the object "O" of the event situation statement are impacted if they are agents, e.g., the user agent "Maggie" in the above described example. At 330, at least one operator is determined to apply on the current situation graph of the at least one impacted situation. In one embodiment, a set of operators are registered and declared to the situation platform, such as situation management platform 110 in FIG. 1. At 340, based on the event, the at least one operator is applied on the current situation graph of the at least one impacted situation. At 350, the current situation graph of the at least one impacted situation is updated.

In one embodiment, as a result of processed operators, the updated situation graph may connect to situation graphs of other impacted agents. For example, a first user may comment on a document initially created by a second user. Thus, situation graphs of the first and the second user may connect in response to the event and the subsequently processed operators. At 360, based on the updated situation graph of the at least one impacted situation, another resource is recommended to the agent. For example, the situation graph of the agent may be augmented with the situation statement "document2 is recommended to Maggie". In one embodiment, a link to the recommended "document2" may pop up. Thus, based on the situation of a user or other agent, personalized recommendation are enabled and adapted to dynamic behavior of the respective user or other agent. If there are more than one impacted situations, the steps 330-360 of process 300 are performed for each impacted situation.

Figure 4:
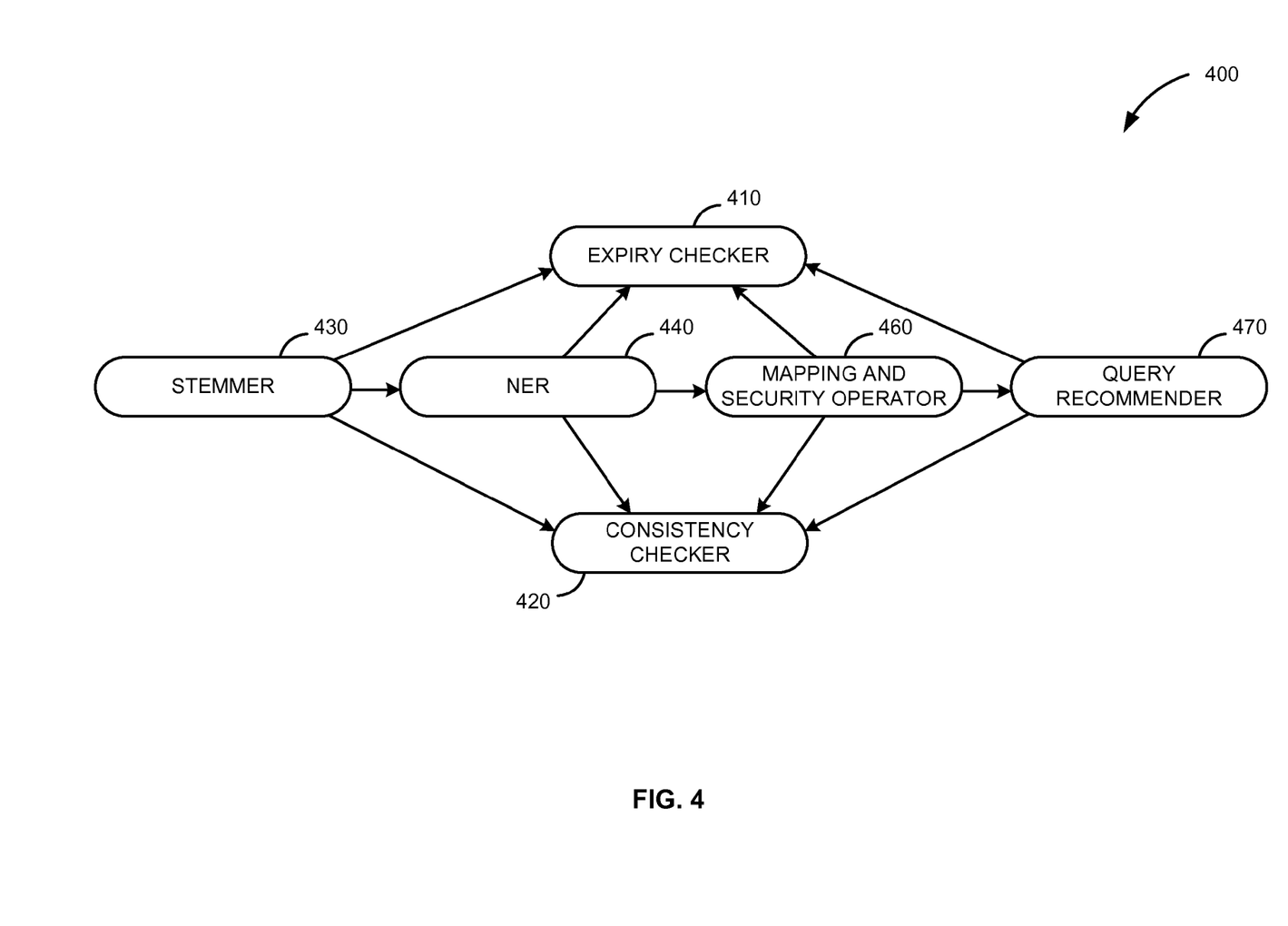
FIG. 4 illustrates an exemplary graph of dependencies between operators, according to one embodiment.

In one embodiment, the at least one operator is a module that takes the event and the at least one impacted situation as input and, in response to the event, outputs an updated impacted situation. A situation may be updated by adding, updating or deleting situation statements. In one embodiment, the situation graph may be augmented or updated by adding situation statements representing an event such as "Maggie reading document1". In one embodiment, additional situation statements may be added to the situation graph in response to the processing of operations defined by the at least one operator, e.g. statements generated in response to the execution of a NER operator applied on an unstructured document. In one embodiment, operators may perform specific tasks or operations independently, or operators may be mutually dependent, e.g. an operator may be activated only if another operator has been already processed. FIG. 4 illustrates an exemplary graph of dependencies between operators.

FIG. 4 illustrates an exemplary graph 400 of dependencies between operators. In one embodiment, a situation platform such as situation management platform 110 in FIG. 1 manages a number of operators. In FIG. 4, expiry checker 410 is a system operator that checks situation statements of a situation to determine those that are outdated and to delete them from the respective situation graph, accordingly. In one embodiment, outdated statements may be stored as historical data. In one embodiment, the timestamp "t" and the validity period "l" of situation statements may be used to determine if they are expired.

Consistency checker 420 is a system operator that checks for ambiguous or conflicting situation statements of a situation to ensure accuracy of the situation. For example, if consistency checker 420 detects conflicting situation statements in a situation, such as "Maggie has location position1" and "Maggie has location position2", where "position1" and "position2" may be in different cities or are distant. Consistency checker 420 may be applied to resolve ambiguities. In one embodiment, the confidence attribute "c" of the situation statements may be used to determine the accuracy or reliability of statements, e.g., a more recent situation statement with a higher confidence may be preferred.

Stemmer 430 is an operator that applies stemming to unstructured resources, such as documents or electronic mails. NER 440 is an operator that applies named entity recognition to an unstructured resource of a situation to identify atomic elements and classify them into categories such as names, persons, addresses, quantities, etc. Mapping and security operator 460 maps extracted entities from an unstructured resources of a situation to objects in a data warehouse and authenticates the agent of the situation to the data warehouse. Query recommender 470 is a recommendation operator that, based on mapped extracted entities from an unstructured resource to objects in a data warehouse, recommends OLAP queries that may be executed over the data warehouse.

In one embodiment, execution of one operator may be contingent upon the outcome of another operator. Mutual dependencies between operators may be declared. For example, in FIG. 4, execution of operators stemmer 430, NER 440, mapping and security 460, query recommender 470, depends on both expiry checker 410 and consistency checker 420. Operator NER 440 depends on the stemmer 430 to increase performance of named entity recognition by utilizing the stemming operations executed over an unstructured resource. Entities extracted by NER 440 are mapped to objects in a data warehouse by operator 460, thus operator 460 depends on NER 440. Query recommender 470 depends on the objects of the data warehouse to which the extracted entities are mapped to recommend relevant OLAP query based on the objects. In one embodiment, in FIG. 1, a graph of dependencies between operators, such as graph 153, may be declared to situation management platform 110.

In one embodiment, dependencies between operators may be implemented by adding corresponding condition to activation rules such as activation rules 170 in FIG. 1. The dependency between NER 440 and Stemmer 430 may be implemented in an activation rule that invokes operator NER 440 by adding a condition to check whether, for example, a situation statement "Stemmer has processed document1" exists.

Figure 5:
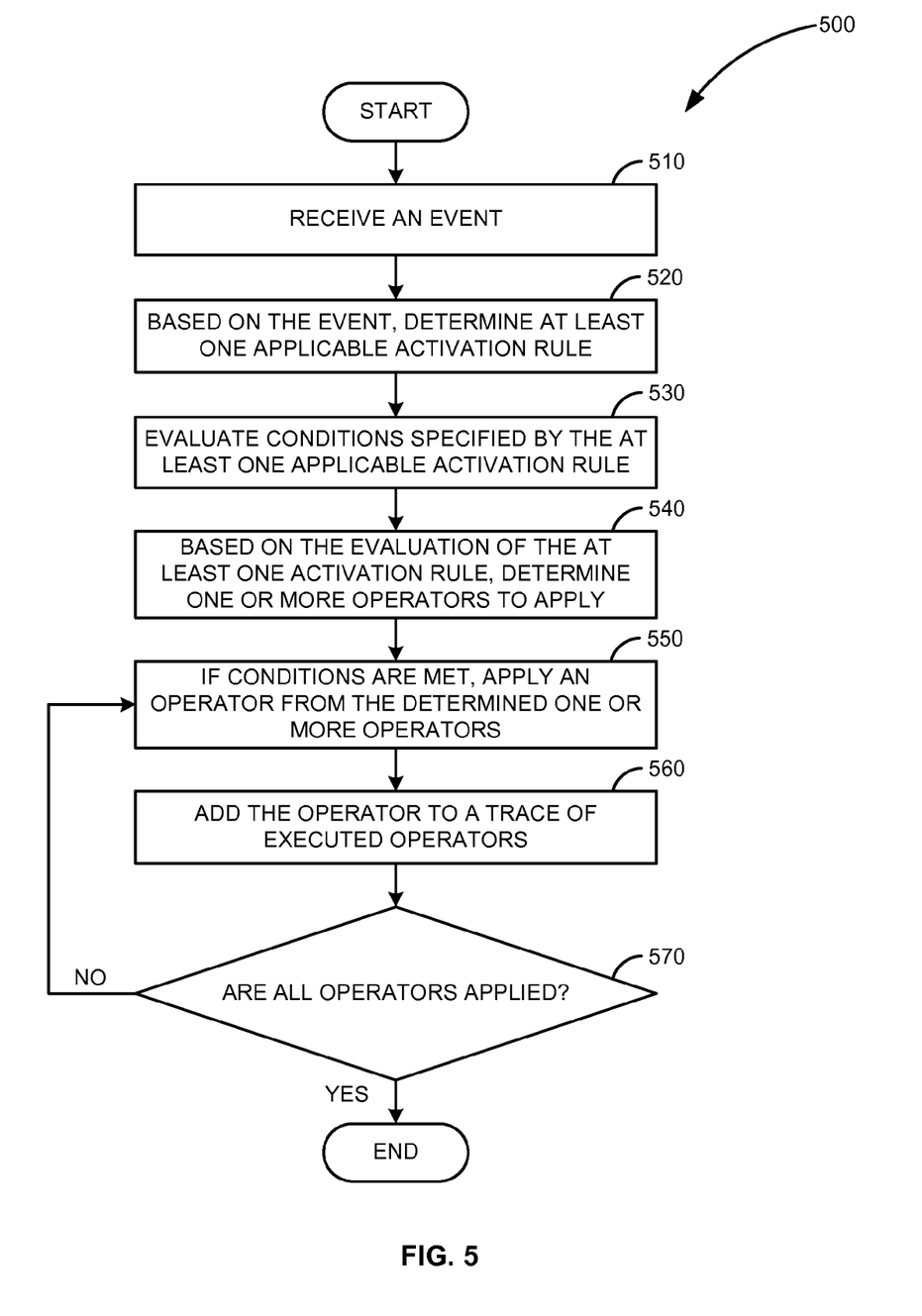
FIG. 5 illustrates process for determining operators to apply on situations graphs in response to an event, according to one embodiment.

FIG. 5 illustrates process 500 for determining operators to apply on situations graphs in response to an event, according to one embodiment. At 510, an event is received. In one embodiment, the received events may be stored in a queue, such as queue 155 in FIG. 1, to be processed asynchronously by a situation platform, such as situation management platform 110. At 520, at least one applicable activation rule is determined based on the event. In one embodiment, one or more of available activation rules, such as activation rules 170 in FIG. 1, are evaluated to determine one or more applicable rules that react to the event. An activation rule acts in response to specific events and triggers additional processing, if a set of conditions specified by the rule are met. In one embodiment, the structure of an activation rule may consist of an event, a condition and an action part. An example of an activation rule implemented in RDF is:

```
<rule>
    <event>
        eventUser:=(SUBJECT HAS_TYPE ".../#UserAgent") AND
        eventDoc:=(OBJECT HAS_TYPE
        ".../#UnstructuredDocument")
    </event>
    <condition>
        NOT(EXISTS(s,
        (s.SUBJECT IS ".../operators/stemming")AND
        (s.PREDICATE IS ".../predicates/has_processed") AND
        (s.OBJECT IS eventDoc))
    </condition>
    <action>
```

-continued

```
        CALL ".../operators/stemming"
            WITH_PARAMS eventDoc
            ON_BEHALF_OF eventUser
    </action>
</rule>
```

The above illustrated activation rule is specified to react to events where a user agent is interacting with an unstructured document. For example, such event is "Maggie reading document1".

The event part of activation rules is used to filter events to which the activation rule reacts and thus trigger additional processing. Thus, event parts of available activation rules are evaluated to determine those rules responding to the received event. At 530, conditions specified by the at least one applicable activation rule are evaluated. Thus, the condition part of the event is evaluated. For example, such condition is "operatorB can be applied if 'operatorA has processed document1'". Other exemplar conditions are used as execution guards to prevent multiple executions of the same operator in the same situation. Examples of execution guards, include but are not limited to, "NOT(operatorA hasProcessed document1)", "EXISTS(opA hasProcessed document1)", etc. In the above illustrated activation rule example, the condition part of the rule is an execution guard that checks whether a stemming operator has already been applied. In one embodiment, conditions may be evaluated by querying graph repository 140 in FIG. 1. For example, one or more of providers 122-126 may translate the condition part of an activation rule from RDF format to a SPARQL query to be executed over respective graphs 142-146 in graph repository 140, or over respective situation graphs 162-164 (FIG. 1).

At 540, one or more applicable operators relevant to the event are determined based on the evaluation of the action part of the at least one activation rule. In the above illustrated example, the activation rule specifies that a stemming operator is relevant to the received event. At 550, an operator from the determined one or more operators is applied in response to the event, if the conditions specified by the applicable rule are met. In the above illustrated example, if a stemming operator has not been already executed, then it is applied on the unstructured document1. At 560, the applied operator is added to a trace of executed operators. Thus, in response to an event, the operators applied to a given situation are tracked to prevent multiple execution of same operator. At 570, a check is performed whether all operators determined at 540 are applied. If there are any unapplied operators, then the process continues at 550. Activation rules enable proper application of operators as events are received.

In one embodiment, additional parameters generated as a result of the activation rule evaluation may be passed to invoked operators.

In one embodiment, an activation rule that responds to the received event may not be determined. For example, an activation rule, although configured to react to the received event may be disabled by a user. If no activation rule reacts to the event, then no operator might be triggered and no recommendations would be provided to the user.

Figure 6:
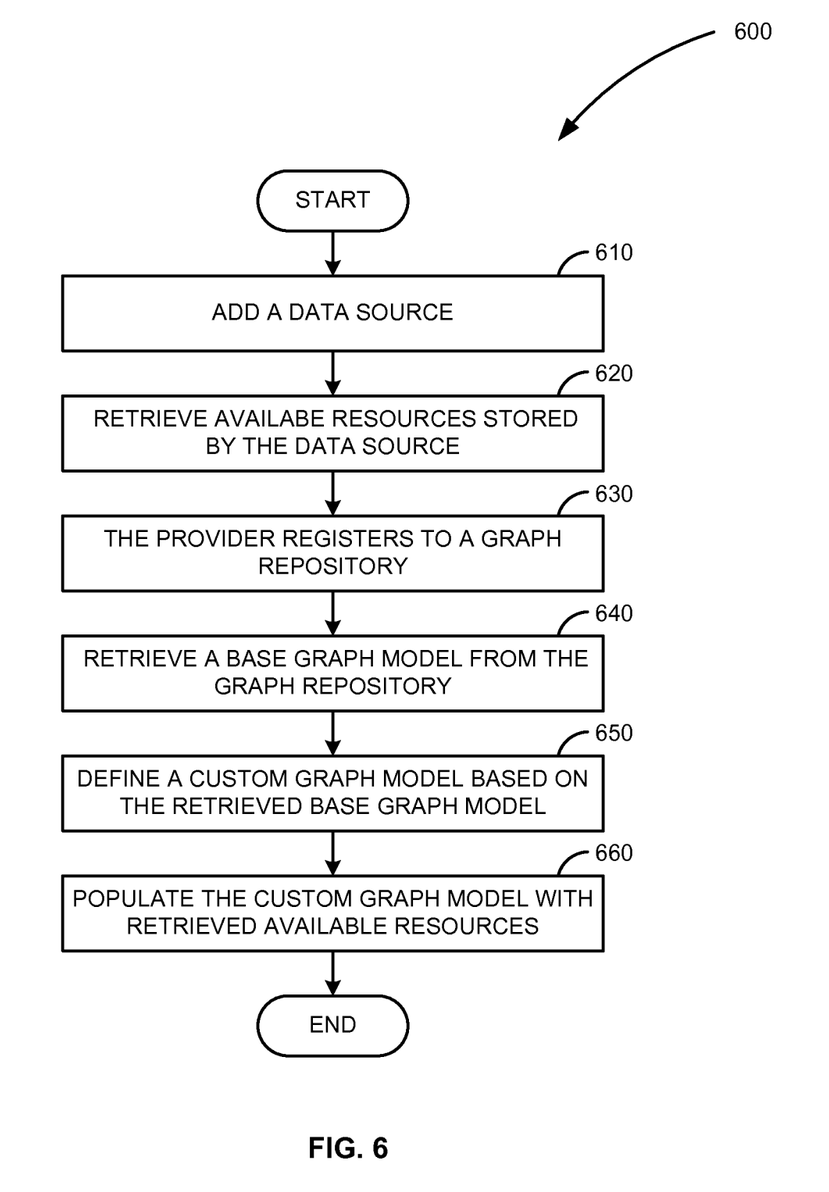
FIG. 6 illustrates process for representing heterogeneous data resources in a graph based data model, according to one embodiment.

FIG. 6 illustrates process 600 for representing heterogeneous data resources in a graph based data model, according to one embodiment. The process starts at 610 with adding a data source. In one embodiment, a new data source may be added to system architecture 100 in FIG. 1. As a result, a specific provider is developed to communicate with and retrieve data from the newly added data source. Thus, a provider specifies the logic for retrieving data from a specific data source. At 620, available resources provided by the data source are retrieved by the providers. At 630, the provider registers to a graph repository. At 640, a base graph model is retrieved from the graph repository. Providers create models of retrieved data based on a general graph model, such as graph model 148, to enable common representation of heterogeneous resources. At 650, a custom graph model is defined based on the retrieved base graph model. In one embodiment, the provider extends the retrieved base graph model by adding custom types of nodes and relations to define a custom graph model tailored to the respective data source. At 660, the custom graph model is populated with retrieved available resources. In one embodiment, the providers supply the custom graph model with resources provided by the respective heterogeneous data sources.

In one embodiment, access to resources may be restricted or other security constraints may be imposed by source systems. Therefore, providers may authenticate to respective data sources to enable secure retrieval of data. In one embodiment, client applications such as client(s) 180 (FIG. 1) may derive a user's credentials and enable authentication of the user to recommender system 105. For example, a method for user authentication to recommender system 105 may be a "GET" method based on REST services, that takes as input a user's login and password and returns an unique token subsequently used for data retrieval.

FIG. 7 is a graphical user interface diagram of GUI 700 showing situation statements generated by a Text-to-Query recommender operator in response to an event, according to one embodiment. In one embodiment, Text-to-Query is a recommendation operator that generates structured queries such as OLAP queries to be executed on a data warehouse. In one embodiment, the structured queries are generated based on an unstructured document such as text document.

In FIG. 7, situation statements generated in response to the event 730 are displayed. In this exemplary scenario, event 730 is an interaction between a user and an unstructured document, e.g., "Maggie read document1". Window 710 displays events that are already processed and window 720 displays events that are queued for subsequent processing. In window 710, event 730 is displayed as well as origin 735 of the event that indicates the source system or application of the event, e.g., "EmailClient_Plugin". Window 740 displays related to event 730 situation statements that are generated as result of processing event 730. Each situation statement of related statements 740 is described by attributes 742-752. Attribute 742 indicates the subject "S" for each situation statement; Attribute 744 indicates the predicate "P"; Attribute 746 indicates the object "O"; Attribute 748 indicates origin metadata "o"; Attribute 750 indicates timestamp metadata "t"; Attribute 752 indicates confidence metadata "c".

Text-to-Query operator may use as a data source a BI data warehouse. In the BI data warehouse, multi-dimensional OLAP cubes may be built to define metadata such as measures, dimensions, hierarchies, dependencies, etc. In one embodiment, a specific provider is built to generate and populate a corresponding graph model of the underlying source data, according to process 600 illustrated in FIG. 6. Example of such graph model may be a graph model declared in graph repository 140 in FIG. 1. Further, the provider may authenticate to the respective data warehouse to enable secure retrieval of data.

In one embodiment, once event 730 "Maggie reading document1" is received at or dispatched to the Text-to-Query system, the situation of the user agent "Maggie" is determined, according to process 300 described in FIG. 3. Further, an activation rule tailored to react to such event is evaluated, according to process 500 described in FIG. 5. Consequently, based on the rule evaluation, a number of operators are triggered and applied to the retrieved situation of "Maggie". Examples of operators that may be applied include, but are not limited to, stemming operator such as stemmer 430, NER such as NER 440, mapping and security operator such as operator 460, query recommender such as query recommender 471 (FIG. 4). Therefore, a stemming operator analyzes the text of "document1" to reduce or classify words to their stem or root form. A NER operator is applied to the already stemmed text to extract entities from "document1". A mapping operator maps the extracted entities to business object entities available in the BI data warehouse. As a result, the situation of "Maggie" is augmented with new situation statements such as statements 742-744. The Text-to-Query recommendation operator, based on the extracted and mapped entities, generates relevant BI queries that may be executed over the BI data warehouse. As a result, situation statements are added to "Maggie's" situation that corresponds to the generated BI queries, e.g., statements 760-780. Therefore, based on unstructured text document, relevant BI queries are recommended to a user.

Figure 8:
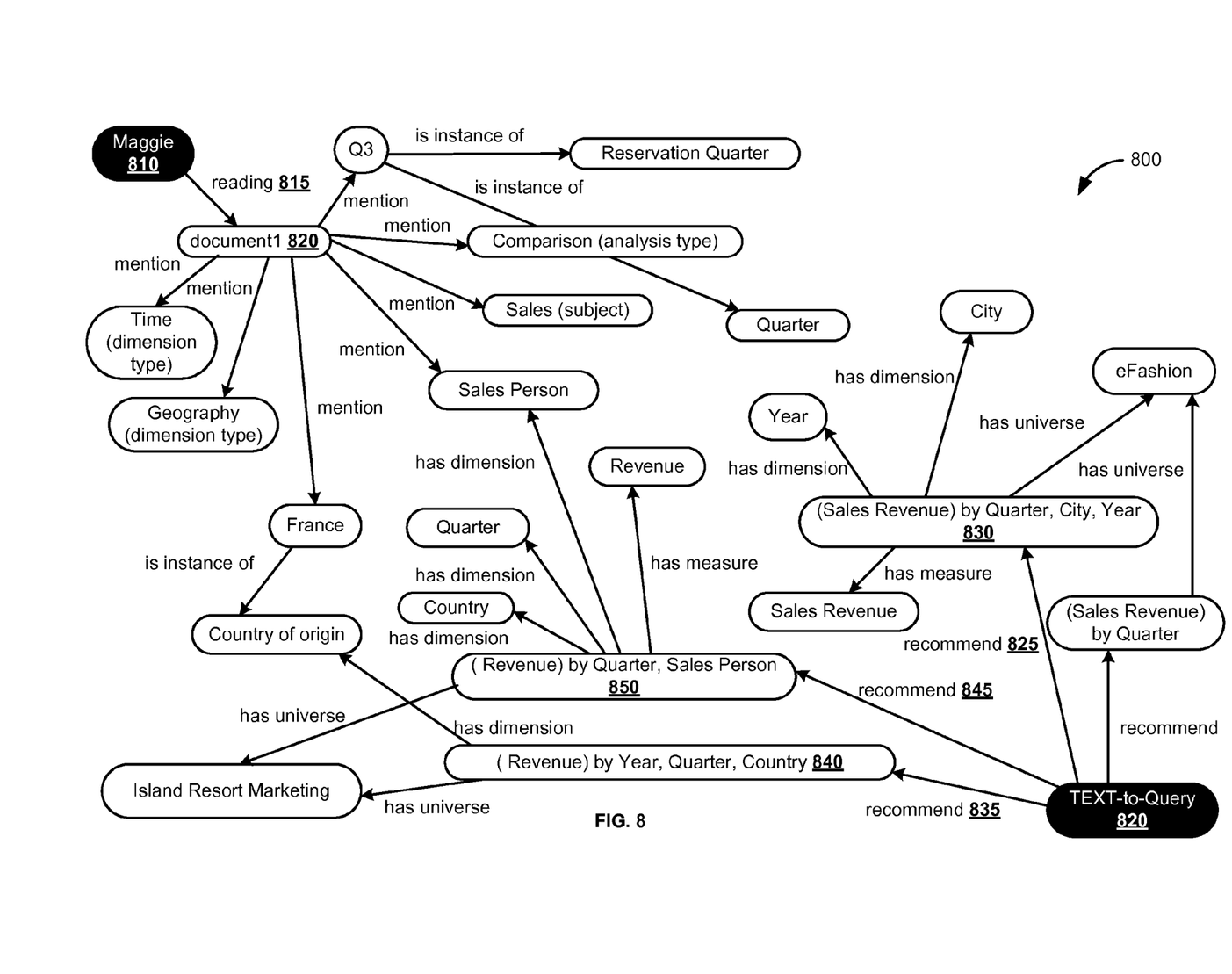
FIG. 8 illustrates an exemplary situation graph including recommendation statements generated in response to an event, according to one embodiment

FIG. 8 illustrates an exemplary situation graph 800 including recommendation statements generated in response to an event, according to one embodiment. Situation graph 800 represents the situation of the user agent "Maggie" 810 including situation statements generated by the Text-to-Query recommendation operator illustrated in FIG. 7. In FIG. 8, event 730 "Maggie reading document1" is represented by nodes 810, 820, and edge 815, respectively. Situation graph 800 includes recommendation statements 760-780 generated by Text-to-Query operator, illustrated as node 820. Recommendation statement 760 "Text-to-Query recommend '(Sales Revenue) by Quarter, City, Year'" is represented by nodes 820, 830 and edge "recommend" 825. Similarly, recommendation statement 770 "Text-to-Query recommend '(Revenue) by Year, Quarter, Country'" is represented by nodes 820, 840, and edge 835, respectively. Further, recommendation statement 780 "Text-to-Query recommend '(Revenue) by Quarter, Sales Person'" is represented by nodes 820, 850, and edge 845, respectively. Situation graph 800 represents the situation of the user agent "Maggie" 810, updated in response to event "Maggie reading document1" to include, among other statements, generated recommendation statements.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
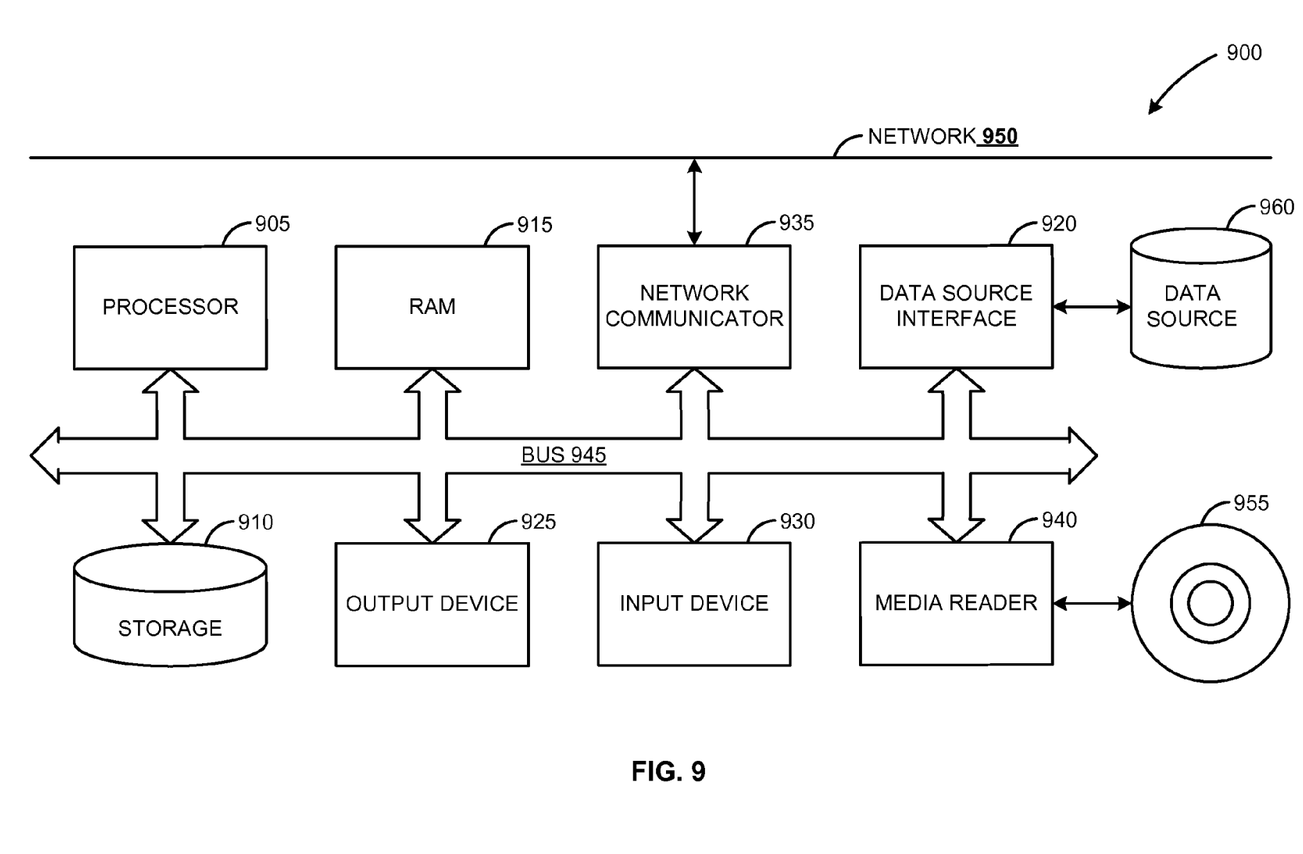
FIG. 9 is a block diagram of an exemplary computer system to generate situational recommendations in a heterogeneous system environment, according to one embodiment.

FIG. 9 is a block diagram of an exemplary computer system 900. The computer system 900 includes a processor 905 that executes software instructions or code stored on a computer readable storage medium 955 to perform the above-illustrated methods of the invention. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment of the invention, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method to generate a recommendation in a heterogeneous computer system environment, the method comprising:
    receiving an event generated in response to an interaction between an agent and a first resource from a plurality of resources available at the heterogeneous computer system environment, the event represented by a situation statement from a plurality of situation statements, wherein a subject of the situation statement is the agent, an object of the situation statement is the first resource, and a predicate of the situation statement is the interaction between the agent and the first resource;
    based on the received event:
        determining at least one impacted situation graph from a plurality of situations graphs, the at least one impacted situation graph comprising a collection of situation statements from the plurality of situation statements related to the agent;
        loading into a memory the at least one impacted situation graph;
        evaluating a plurality of activation rules to determine an applicable activation rule to react to the received event, wherein each of the plurality of activation rules include an event part that specifies a type of event to which the activation rule reacts, a condition part that determines triggering one or more operators relevant to the type of event, and an action part to trigger the one or more operators relevant to the type of event;
        determining the applicable activation rule based on an event part of the applicable activation rule matching a type of the received event;
    upon verifying a condition part of the applicable activation rule, triggering a first operator from one or more relevant operators specified by the applicable activation rule;
    in response to triggering the first operator, a computer updating the at least one impacted situation graph by applying the first operator to the at least one impacted situation graph; and
    based on the at least one updated situation graph, generating a recommendation of a second resource from the plurality of resources by a recommender system of the computer system environment.

2. The method of claim 1, wherein triggering the first operator further comprises:
    upon verifying whether a second operator is executed, determine applicability of the first operator.

3. The method of claim 1, wherein updating the at least one impacted situation graph by applying the first operator to the at least one impacted situation further comprises:
    in response to receiving the event updating at least one situation statement of the collection of situation statements of the at least one impacted situation graph.

4. The method of claim 1, wherein generating the recommendation of the second resource from the plurality of resources to the agent further comprises:
    adding a situation statement representing the recommendation to the collection of situation statements of the at least one impacted situation.

5. The method of claim 1, further comprising:
    generating at least one graph model of the plurality of resources, wherein a plurality of nodes of the graph model represents the plurality of resources and a plurality of edges of the graph model represents relations between the plurality of resources.

6. The method of claim 1, wherein loading the at least one impacted situation graph further comprises:
    retrieving a set of valid situation statements from the collection of situation statements related the agent.

7. The method of claim 1, further comprising:
    authenticating the agent to the recommender system, and accessing a restricted portion of the plurality of resources based on the authentication.

8. A computer recommender system to generate at least one recommendation, the system including:
    at least one processor and memory to execute program code related to:
        receive an event generated in response to an interaction between an agent and at least one resource from a plurality of resources, the event represented by a situation statement from a plurality of situation statements, wherein a subject of the situation statement is the agent, an object of the situation statement is the first resource, and a predicate of the situation statement is the interaction between the agent and the first resource;
        based on the received event:
            determine at least one impacted situation graph from a plurality of situations graphs, the at least one impacted situation graph comprising a collection of situation statements from the plurality of situation statements related to the agent;
            load into a memory the at least one impacted situation graph;
            evaluate a plurality of activation rules to determine an applicable activation rule to react to the event, wherein each of the plurality of activation rules include an event part that specifies a type of event to which the activation rule reacts, a condition part that determines when to trigger one or more operators relevant to the type of event, and an action part to trigger the one or more operators relevant to the type of event;

determining the applicable activation rule based on an event part of the applicable activation rule matching a type of the received event;

upon verifying a condition part of the applicable activation rule, trigger a first operator from one or more relevant operators specified by the applicable activation rule;

in response to triggering the first operator, update the at least one impacted situation graph by applying the at least one operator on to the at least one impacted situation graph; and based on the at least one updated situation graph, recommend at least one additional resource from the plurality of resources.

9. The system of claim 8, wherein triggering the first operator further comprises:

upon verifying, whether a second operator is executed determine applicability of the first operator.

10. The system of claim 8, wherein updating the at least one impacted situation graph by the at least one operator further comprises:

based on the event, updating at least one situation statement of the collection of situation statements of the at least one impacted situation graph.

11. The system of claim 8, wherein recommending the at least one additional resource from the plurality of resources further comprising:

adding a situation statement representing the recommendation to the collection of situation statements of the at least one impacted situation graph.

12. The system of claim 8, wherein the memory comprises:

at least one graph model of the plurality of resources, wherein a plurality of nodes of the graph model represents the plurality of resources and a plurality of edges of the graph model represents relations between the plurality of resources.

13. The system of claim 8, wherein loading the at least one impacted situation graph further comprises:

retrieving a set of valid situation statements from the collection of situation statements related to the agent.

14. A non-transitory computer readable medium storing instructions thereon, which when executed by a processor cause a computer system to:

receive an event generated in response to an interaction between an agent and a first resource from a plurality of resources, the event represented by a situation statement from a plurality of situation statements, wherein a subject of the situation statement is the agent, an object of the situation statement is the first resource, and a predicate of the situation statement is the interaction between the agent and the first resource;

based on the received event:

determine at least one impacted situation graph from a plurality of situations graphs, the at least one impacted situation graph comprising a collection of situation statements from the plurality of situation statements related to the agent;

loading into a memory the at least one impacted situation graph;

evaluate a plurality of activation rules to determine an applicable activation rule to react to the event, wherein each of the plurality of activation rules include an event part that specifies a type of event to which the activation rule reacts, a condition part that determines when to trigger one or more operators relevant to the type of event, and an action part to trigger the one or more operators relevant to the type of event;

determine the applicable activation rule based on an event part of the applicable activation rule matching a type of the received event;

upon verifying a condition part of the applicable activation rule, trigger a first operator from one or more relevant operators specified by the applicable activation rule;

in response to triggering the first operator, update the at least one impacted situation graph by applying the at least one operator on to the at least one impacted situation graph; and based on the at least one updated situation graph, the computer to recommend a second resource from the plurality of resources.

15. The computer readable medium of claim 14, wherein triggering the first operator further comprises:

upon verifying, whether a second operator is executed determine applicability of the first operator.

16. The computer readable medium of claim 14, wherein updating the at least one impacted situation graph by the at least one operator further comprises:

based on the event, updating at least one situation statement of the collection of situation statements of the at least one impacted situation.

17. The computer readable medium of claim 14, wherein recommending the second resource from the plurality of resources further comprising:

adding a situation statement representing the recommendation to the collection of situation statements of the at least one impacted situation graph.

18. The computer readable medium of claim 14 storing instructions thereon, which when executed by the processor cause the computer system further to:

generate at least one graph model of the plurality of resources, wherein a plurality of nodes of the graph model represents the plurality of resources and a plurality of edges of the graph model represents relations between the plurality of resources.

19. The computer readable medium of claim 14, wherein loading the at least one impacted situation graph further comprises:

retrieving a set of valid situation statements from the collection of situation statements related to the agent.

20. The computer readable medium of claim 14 storing instructions thereon, which when executed by the processor cause the computer system further to:

authenticate the agent to the recommender system, and access a restricted portion of the plurality of resources based on the authentication.

* * * * *